United States Patent
Son et al.

(10) Patent No.: US 8,637,208 B2
(45) Date of Patent: Jan. 28, 2014

(54) ELECTRODE FOR FUEL CELL, MEMBRANE-ELECTRODE ASSEMBLY INCLUDING SAME, AND FUEL CELL SYSTEM INCLUDING SAME

(75) Inventors: In-Hyuk Son, Suwon-si (KR); Sang-Il Han, Suwon-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 1251 days.

(21) Appl. No.: 11/882,465

(22) Filed: Aug. 1, 2007

(65) Prior Publication Data

US 2009/0130515 A1 May 21, 2009

(30) Foreign Application Priority Data

Nov. 10, 2006 (KR) .................. 10-2006-0111143

(51) Int. Cl.
- *H01M 4/86* (2006.01)
- *H01M 4/88* (2006.01)
- *H01M 4/92* (2006.01)
- *H01M 8/10* (2006.01)

(52) U.S. Cl.
USPC ............ 429/530; 429/481; 429/524; 502/101

(58) Field of Classification Search
None
See application file for complete search history.

(56) References Cited

U.S. PATENT DOCUMENTS

| | | |
|---|---|---|
| 2001/0050230 A1 | 12/2001 | Surampudi |
| 2003/0064265 A1 | 4/2003 | Hampden-Smith |
| 2004/0081880 A1 | 4/2004 | Chang |
| 2004/0115515 A1 | 6/2004 | Ueda et al. |
| 2006/0188772 A1* | 8/2006 | Starz et al. ............... 429/42 |
| 2007/0259267 A1 | 11/2007 | Ota et al. |

FOREIGN PATENT DOCUMENTS

| | | |
|---|---|---|
| EP | 1 175 948 | 1/2002 |
| JP | 2002246033 | 8/2002 |
| JP | 2003-059497 | 2/2003 |
| JP | 2004146223 A | 5/2004 |
| WO | 2006019128 A1 | 2/2006 |
| WO | WO 2006/041212 | 4/2006 |

OTHER PUBLICATIONS

*Search Report* from the European Patent Office issued in Applicant's corresponding Korean Patent Application No. 07116943.7 dated Jan. 31, 2008.

Chinese Office Action issued by SIPO dated Nov. 11, 2010 corresponding to Chinese Patent Application No. 2007-10145706.7, together with full English Translation.

European Office Action (Application No. 07 116 943.7), issued by European Patent Office on Mar. 4, 2011. Corresponding to Korean Patent Application No. 10-2006-0111143.

Chinese Office Action issued Apr. 24, 2012 in connection with Chinese Patent Application Serial No. 200710145706.7, which also claims Korean Patent Application Serial No. 10-2006-0111143 as its priority document.

(Continued)

*Primary Examiner* — John S Maples (74) *Attorney, Agent, or Firm* — Robert E. Bushnell, Esq.

(57) ABSTRACT

The electrode for a fuel cell according to one embodiment of the present invention includes an electrode substrate and a catalyst layer disposed on the electrode substrate, the catalyst layer including metal nanoparticles, a binder and a catalyst. The metal nanoparticles in the catalyst layer improve electrical conductivity, and also have catalyst activity to implement a catalytic synergetic effect so as to provide a high power fuel cell.

30 Claims, 4 Drawing Sheets

(56) References Cited

OTHER PUBLICATIONS

The Decision On Reexamination dated Jun. 14, 2013 issued by The Patent Reexamination Board in China corresponding the Chinese Patent Application serial No. 200710145706.7, which also claims Korean Patent Application serial No. 10-2006-0111143 as its priority document with its English abstract.

Jin Luo et al., Electrocatalytic oxidation of methanol: carbon-supported gold-platinum nanoparticle catalysts prepared by two-phase protocol, Catalysis Today, vol. 99, pp. 291-297, (2005).

Japanese Office Action mailed on Mar. 26, 2013 in the corresponding Japanese patent application No. 2007-73049.

Korean Office Action mailed on Apr. 19, 2013 in the corresponding Korean patent application No. 10-2006-0111143.

* cited by examiner

ELECTRODE FOR FUEL CELL, MEMBRANE-ELECTRODE ASSEMBLY INCLUDING SAME, AND FUEL CELL SYSTEM INCLUDING SAME

CLAIM OF PRIORITY

This application makes reference to, incorporates the same herein, and claims all benefits accruing under 35 U.S.C. §119 from an application for ELECTRODE FOR FUEL CELL, MEMBRANE-ELECTRODE ASSEMBLY INCLUDING SAME, AND FUEL CELL SYSTEM INCLUDING SAME earlier filed in the Korean Intellectual Property Office on the 10, Nov. 2006 and there duly assigned Serial No. 10-2006-0111143.

BACKGROUND OF THE INVENTION

1. Technical Field

The present invention relates to an electrode for a fuel cell, and a membrane-electrode assembly and a fuel cell system including the same. More particularly, the present invention relates to an electrode for a fuel cell which improves electrical conductivity, which has improved catalyst activity, and which provides a high power membrane-electrode assembly and fuel cell system.

2. Related Art

A fuel cell is a power generation system for producing electrical energy through an electrochemical redox reaction of an oxidant and a fuel such as hydrogen, or a hydrocarbon-based material such as methanol, ethanol, natural gas, and the like. Such a fuel cell is a clean energy source which may replace fossil fuels, and includes a stack composed of unit cells and produces various ranges of power output. Since it has a four to ten times higher energy density than a small lithium battery, it has been highlighted as a small portable power source.

Representative exemplary fuel cells include a polymer electrolyte membrane fuel cell (PEMFC) and a direct oxidation fuel cell (DOFC). The direct oxidation fuel cell includes a direct methanol fuel cell which uses methanol as a fuel.

The polymer electrolyte fuel cell has the advantage of high energy density and high power, but it also has problems in that there is a need to carefully handle hydrogen gas and a requirement for accessory facilities such as a fuel reforming processor for reforming methane or methanol, natural gas, and the like in order to produce hydrogen as the fuel gas.

Conversely, the direct oxidation fuel cell has an energy density lower than that of the gas-type fuel cell, but it has the advantages of easy handling of the liquid-type fuel, a low operation temperature, and no need for additional fuel reforming processors. Therefore, it has been acknowledged as an appropriate system for a portable power source for small and common electrical equipment.

SUMMARY OF THE INVENTION

One embodiment of the present invention provides an electrode for a fuel cell which improves electrical conductivity and catalyst activity.

Another embodiment of the present invention provides a membrane-electrode assembly for a fuel cell including the above electrode.

Yet another embodiment of the present invention provides a high power fuel cell system including the above membrane-electrode assembly.

According to one embodiment of the present invention, an electrode for a fuel cell, which includes an electrode substrate, and a catalyst layer disposed on the electrode substrate and including metal nanoparticles, a binder and a catalyst, is provided.

According to another embodiment of the present invention, a membrane-electrode assembly for a fuel cell which includes a cathode and an anode facing each other, and a polymer electrolyte membrane interposed therebetween, is provided. At least one of the anode and the cathode includes an electrode substrate, and a catalyst layer which is disposed on the electrode substrate and which includes metal nanoparticles, a binder, and a catalyst.

According to yet another embodiment of the present invention, a fuel cell system which includes at least one electricity generating element, including the above membrane-electrode assembly, a fuel supplier, and an oxidant supplier, is provided.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

The electrode for a fuel cell according to one embodiment of the present invention includes an electrically conductive metal such as gold, and thereby provides an improved output fuel cell.

The electrode includes an electrode substrate and a catalyst layer which is disposed on the electrode substrate and which includes metal nanoparticles, a binder and a catalyst. The electrode may be applied to either one or both of a cathode and an anode. However, it may promote CO oxidation reactions and thereby oxidation of a fuel, particularly a hydrocarbon fuel, when it is applied to an anode. The electrode may be applied to the anode of a direct oxidation fuel cell since it has an improved oxidation reaction of a hydrocarbon fuel.

The metal includes at least one selected from the group consisting of Au, Ag, Rh, Ir, and combinations thereof. According to one embodiment, Au is appropriate. Such a metal provides water and $OH^-$ to the electrode. A second metal, selected from the group consisting of W, Mo, and combinations thereof, may be used with the metal (hereinafter, referred to as a first metal). The second metal is used in an amount of 0.01 to 1 part by weight based on 100 parts by weight of the first metal. When the second metal is used in an amount of less than 0.01 parts by weight, the effect obtained from the use of the second metal is not satisfied, whereas when it is used in an amount of more than 1 part by weight, ion conductivity may be deteriorated. According to one embodiment, the second metal may be used in an amount of 0.01, 0.02, 0.03, 0.04, 0.05, 0.06, 0.07, 0.08, 0.09, or 1 part by weight based on 100 parts by weight of the first metal.

The mixing ratio of the metal nanoparticles and binder affects fuel cell performance. The catalyst amount is not specifically limited and may be used in a conventional amount. Therefore, the metal nanoparticles and binder are used in a mixing ratio of 0.001 to 10 wt %:99.999 to 90 wt %. According to one embodiment, the metal nanoparticles and binder are used in a mixing ratio of 0.05 to 1 wt %:99.5 to 99 wt %. When the amount of the metal nanoparticles is more than 10 wt %, output may be decreased, whereas when it is less than 0.001 wt %, the effect of the metal nanoparticles is negligible. According to one embodiment, the metal nanoparticles may be used in an amount of 0.001, 0.005, 0.01, 0.02, 0.03, 0.04, 0.05, 0.06, 0.07, 0.08, 0.09, 1, 2, 3, 4, 5, 6, 7, 8, 9, or 10 wt %.

The metal nanoparticles have an average particle size ranging from 1 to 200 nm. According to one embodiment, the metal nanoparticles have an average particle size ranging from 10 to 100 nm. When the average particle size of the metal nanoparticles is less than 1 nm, particle dispersion is not good and the particles are easily aggregated. Conversely, when it is more than 200 nm, catalytic characteristics may be deteriorated. The metal nanoparticles may have an average particle size of 1, 5, 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, or 200 nm.

Examples of the catalyst include platinum, ruthenium, osmium, a platinum-ruthenium alloy, a platinum-osmium alloy, a platinum-palladium alloy, and a platinum-M alloy, where M is a transition element selected from the group consisting of Ga, Ti, V, Cr, Mn, Fe, Co, Ni, Cu, Zn, Sn, Mo, W, Rh, Ru, and combinations thereof. Exemplars of the catalyst include at least one selected from the group consisting of Pt, Pt/Ru, Pt/W, Pt/Ni, Pt/Sn, Pt/Mo, Pt/Pd, Pt/Fe, Pt/Cr, Pt/Co, Pt/Ru/W, Pt/Ru/Mo, Pt/Ru/V, Pt/Fe/Co, Pt/Ru/Rh/Ni, Pt/Ru/Sn/W, and combinations thereof.

Such a metal catalyst may be used in the form of a metal itself (black catalyst) or may be used while being supported on a carrier. The carrier may include carbon-based materials such as graphite, denka black, ketjen black, acetylene black, carbon nanotubes, carbon nanofiber, carbon nanowire, carbon nanoballs and activated carbon, or inorganic material particulates such as alumina, silica, zirconia, titania, and so on. The carbon-based materials are generally used in the art.

The catalyst layer may further include a binder resin to improve its adherence and proton transference.

The binder resin may be a proton conductive polymer resin having a cation exchange group selected from the group consisting of a sulfonic acid group, a carboxylic acid group, a phosphoric acid group, a phosphonic acid group, and derivatives thereof, at its side chain. Non-limiting examples of the polymer include at least one proton conductive polymer selected from the group consisting of fluoro-based polymers, benzimidazole-based polymers, polyimide-based polymers, polyetherimide-based polymers, polyphenylenesulfide-based polymers polysulfone-based polymers, polyethersulfone-based polymers, polyetherketone-based polymers, polyether-etherketone-based polymers, and polyphenylquinoxaline-based polymers. In one embodiment, the proton conductive polymer is at least one selected from the group consisting of poly(perfluorosulfonic acid), poly(perfluorocarboxylic acid), a copolymer of tetrafluoroethylene and fluorovinylether having a sulfonic acid group, defluorinated polyetherketone sulfide, aryl ketone, poly(2,2'-(m-phenylene)-5,5'-bibenzimidazole), and poly(2,5-benzimidazole).

The H may be substituted with Na, K, Li, Cs, or tetrabutylammonium in a proton conductive group of the proton conductive polymer. When the H is substituted with Na in an ion exchange group at the terminal end of the proton conductive group, NaOH is used. When the H is substituted with tetrabutylammonium, tributylammonium hydroxide is used. K, Li, or Cs may also be substituted with the use of appropriate compounds. The method of substituting H is known in this related art, and therefore is not described in further detail.

The binder resin may be used singularly or as a mixture. Optionally, the binder resin may be used along with a non-conductive polymer to improve adherence between a polymer electrolyte membrane and the catalyst layer. The use amount of the binder resin may be adjusted to its usage purpose.

Non-limiting examples of the non-conductive polymer include polytetrafluoroethylene (PTFE), tetrafluoroethylene-hexafluoropropylene (FEP) copolymers, tetrafluoroethylene-perfluoro alkyl vinylether (PFA) copolymers, ethylene/tetrafluoroethylene (ETFE), ethylenechlorotrifluoro-ethylene (ECTFE) copolymers, polyvinylidene fluoride, polyvinylidene fluoride-hexafluoropropylene (PVdF-HFP) copolymers, dodecyl benzene sulfonic acid, sorbitol, and combinations thereof.

As for the electrode substrates, a conductive substrate is used. For example a carbon paper, a carbon cloth, a carbon felt, or a metal cloth (a porous film including a metal cloth fiber or a metalized polymer fiber) may be used, but the invention is not limited thereto.

The electrode substrates may be treated with a fluoro-based resin so as to be water-repellent and to prevent deterioration of diffusion efficiency due to water generated during operation of the fuel cell. The fluoro-based resin may include polytetrafluoroethylene, polyvinylidene fluoride, polyhexafluoropropylene, polyperfluoroan alkylvinylether, polyperfluorosulfonylfluoridealkoxyvinyl ether, fluorinated ethylene propylene, polychlorotrifluoroethylene, or copolymers thereof.

A microporous layer may be added between the above electrode substrates and the catalyst layers to increase reactant diffusion effects. The microporous layer generally includes conductive powders with a particular particle diameter. The conductive material may include, but is not limited to, a carbon powder, carbon black, acetylene black, activated carbon, carbon fiber, fullerene, carbon nanotubes, carbon nanowire, carbon nano-horns, carbon nano-rings, or combinations thereof.

The microporous layer is formed by coating a composition, including a conductive powder, a binder resin and a solvent, on the electrode substrate. The binder resin may include, but is not limited to, polytetrafluoroethylene, polyvinylidenefluoride, polyhexafluoropropylene, polyperfluoroan alkylvinylether, polyperfluorosulfonylfluoride, alkoxyvinyl ether, polyvinylalcohol, celluloseacetate, or copolymers thereof. The solvent may include, but is not limited to, an alcohol such as ethanol, isopropyl alcohol, n-propyl alcohol, butanol, and so on, water, dimethylacetamide, dimethylsulfoxide, N-methylpyrrolidone, tetrahydrofuran, and so on. The coating method may include, but is not limited to, screen printing, spray coating, doctor blade methods, gravure coating, dip coating, silk screening, painting, and so on, depending on the viscosity of the composition.

An electrode with the above structure may be manufactured in accordance with the following three methods.

In the first method, a mixture of metal nanoparticles and a polymer binder is prepared, a catalyst is added to the mixture to prepare a catalyst composition, and an electrode is made using the catalyst composition.

For the binder, the above-described proton conductive binder may be used. When a proton conductive binder and a non-conductive polymer binder are used together, the non-conductive polymer binder is added along with the catalyst. The non-conductive polymer binder is added in an amount of 1 to 10 parts by weight based on 100 parts by weight of the proton conductive binder. When the amount of the non-conductive polymer is less than 1 part by weight, a mass transfer resistance decrease by the non-conductive polymer binder is not sufficient. Conversely, when it is more than 10 parts by weight, proton conductivity of the electrode may deteriorate.

The catalyst is the same as described above. The solvent includes water, alcohols such as methanol, ethanol, isopropyl alcohol and so on, N-methylpyrrolidone, dimethylacetamide, dimethylsulfoxide, tetrahydrofuran, acetone, or mixtures thereof.

The metal nanoparticles or a precursor thereof, and the binder, may be used so that the metal nanoparticles might be 0.001 to 10 wt % and the binder might be 99.999 to 90 wt %. According to one embodiment, the metal nanoparticles or a precursor thereof, and the binder, may be used so that the metal nanoparticles might be 0.05 to 1 wt % and the binder might be 99.95 to 99 wt %. The amounts of the catalyst and solvent may be controlled in an appropriate range.

An electrode may be made using the catalyst composition by forming a catalyst layer on an electrode substrate (CCS: catalyst coated substrate), or by forming a catalyst layer on a polymer electrolyte membrane (CCM: catalyst coated membrane).

Figure 1:
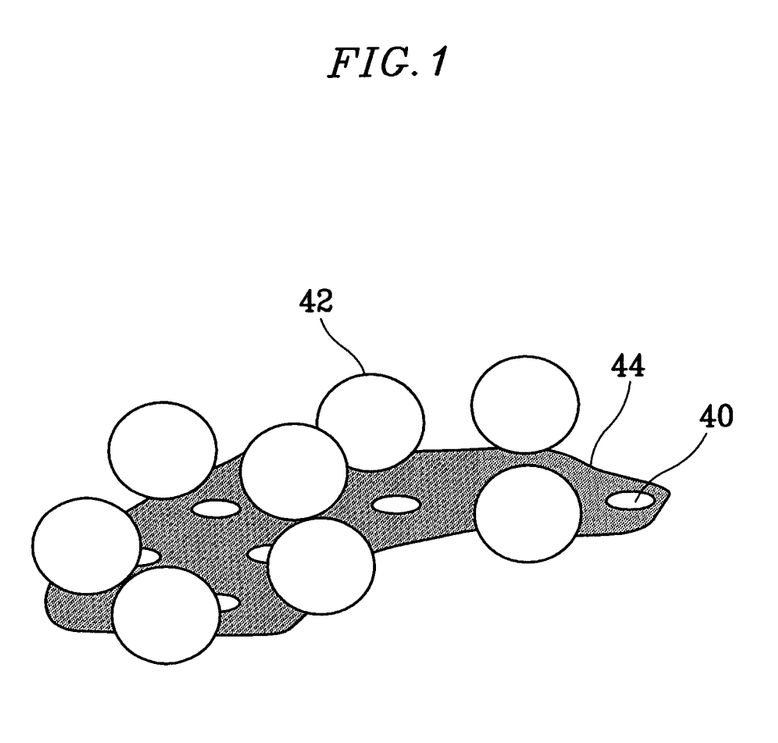
FIG. 1 shows arrangements of the metal nanoparticles, a catalyst and a binder in a catalyst layer according to one embodiment of the present invention.

In the catalyst layer of the electrode according to the above method, arrangements of the metal nanoparticles, catalyst, and binder are shown in FIG. 1. As shown in FIG. 1, the metal nanoparticles 40 are uniformly dispersed in the binder 44, particularly a proton conductive binder, and the catalysts 42 are positioned therein.

Hereinafter, descriptions which are the same as for the first method are not reiterated.

Figure 2:
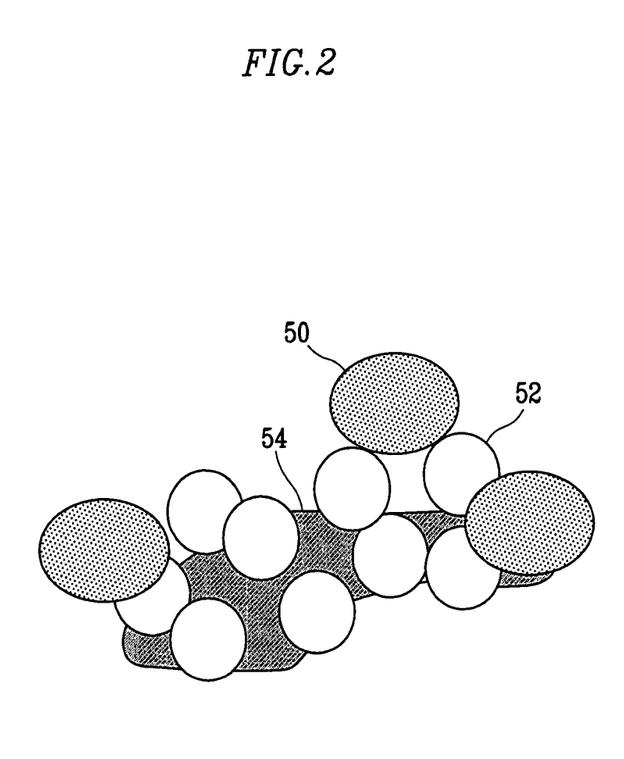
FIG. 2 shows arrangements of metal nanoparticles, a catalyst and a binder in a catalyst layer according to another embodiment of the present invention.

In the second method, a mixture of a catalyst and a binder is prepared, metal nanoparticles are added to the mixture to prepare a catalyst composition, and an electrode is made using the catalyst composition. In the resulting catalyst layer of the electrode, arrangements of the metal nano particle, catalyst and binder are shown in FIG. 2. The catalysts 52 are positioned closer to the surface of the binder 54 than to the metal nanoparticles 50.

In the third method, a mixture of metal nanoparticles and a catalyst is prepared, a binder is added to the mixture to prepare a catalyst composition, and an electrode is made using the catalyst composition. A metal nanoparticle precursor may be used instead of the metal nanoparticles. The catalyst is mixed with a metal nanoparticle precursor, heat treatment is performed at 200 to 300° C., and then a binder is added to the heat-treated product.

Examples of the metal nanoparticle precursor include $AuCl_3$, $AuCN$, $AuCl$, $AuCl_4H$, $AuCl_4K$, $AuCl_4Na$, $AuBr_3$, $AuBr_4H$, $AuBrK$, $AuH_3O_3$, $AuI$, $AuI_4K$, $AuNa_3O_6S_4$, $Au_2O_3$, $Au_2S$, $Au_2S_3$, and combinations thereof.

Figure 3:
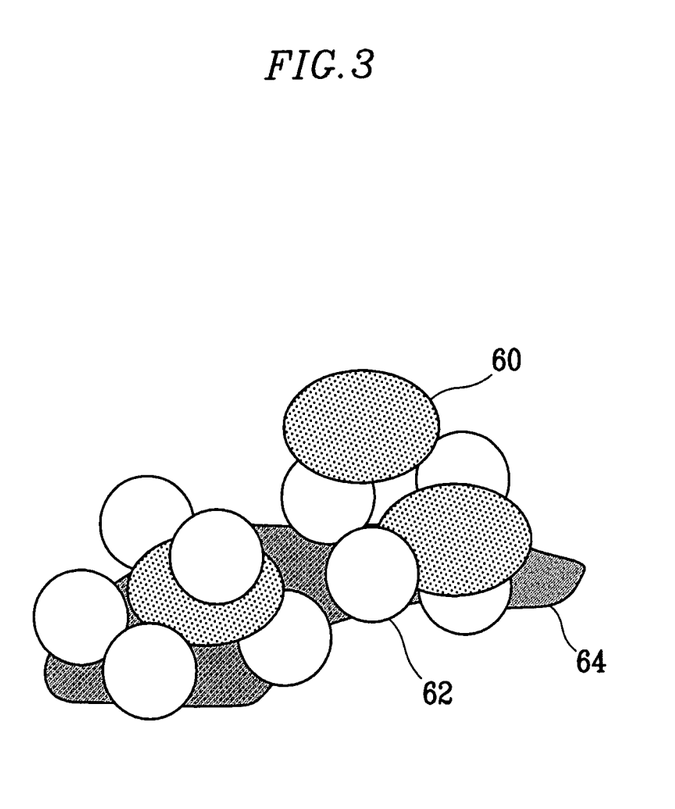
FIG. 3 shows arrangements of metal nanoparticles, a catalyst and a binder in a catalyst layer according to yet another embodiment of the present invention.

In the resulting catalyst layer of the electrode, arrangements of the metal nanoparticles, catalyst, and binder are shown in FIG. 3. The metal nanoparticles 60 and catalysts 62 are mixed on the surface of the binder 64.

Referring to FIGS. 1 thru 3, the fine metal nanoparticles may be formed uniformly in the binder in the catalyst layer of the electrode made according to the first method. Therefore, an electrode made according to the first method has very improved conductivity.

According to one embodiment of the present invention, a membrane-electrode assembly including the electrode as at least one of a cathode and an anode is provided. The membrane-electrode assembly includes an anode and a cathode facing each other, and an electrolyte interposed therebetween. In one embodiment, the above electrode may be particularly used as an anode.

The polymer electrolyte membrane may include any proton conductive polymer resin which is generally used for a polymer electrolyte membrane. The proton conductive polymer resin is a polymer resin having a cation exchange group selected from the group consisting of a sulfonic acid group, a carboxylic acid group, a phosphoric acid group, a phosphonic acid group, and derivatives thereof, at its side chain.

Non-limiting examples of the polymer resin include at least one selected from the group consisting of fluoro-based polymers, benzimidazole-based polymers, polyimide-based polymers, polyetherimide-based polymers, polyphenylenesulfide-based polymers polysulfone-based polymers, polyethersulfone-based polymers, polyetherketone-based polymers, polyether-etherketone-based polymers, and polyphenylquinoxaline-based polymers. In one embodiment, the polymer resin is at least one selected from the group consisting of poly(perfluorosulfonic acid), poly(perfluorocarboxylic acid), a copolymer of tetrafluoroethylene and fluorovinylether having a sulfonic acid group, defluorinated polyetherketone sulfide, aryl ketone, poly(2,2'-(m-phenylene)-5,5'-bibenzimidazole), and poly(2,5-benzimidazole).

The H may be substituted with Na, K, Li, Cs or tetrabutylammonium in a proton conductive group of the proton conductive polymer. When the H is substituted with Na in an ion exchange group at the terminal end of the proton conductive group, NaOH is used. When the H is substituted with tetrabutylammonium, tributylammonium hydroxide is used. K, Li, or Cs may also be substituted by using appropriate compounds. A method of substituting H is known in the related art, and therefore is not described in further detail.

According to one embodiment of the present invention, a fuel cell system including the above membrane-electrode assembly is provided. The fuel cell system of the present invention includes at least one an electricity generating element, a fuel supplier, and an oxidant supplier. The electricity generating element generates electricity through oxidation of a fuel and reduction of an oxidant.

The fuel supplier plays the role of supplying the electricity generating element with a fuel. The fuel includes liquid or gaseous hydrogen, or a hydrocarbon-based fuel such as methanol, ethanol, propanol, butanol, and natural gas.

Figure 4:
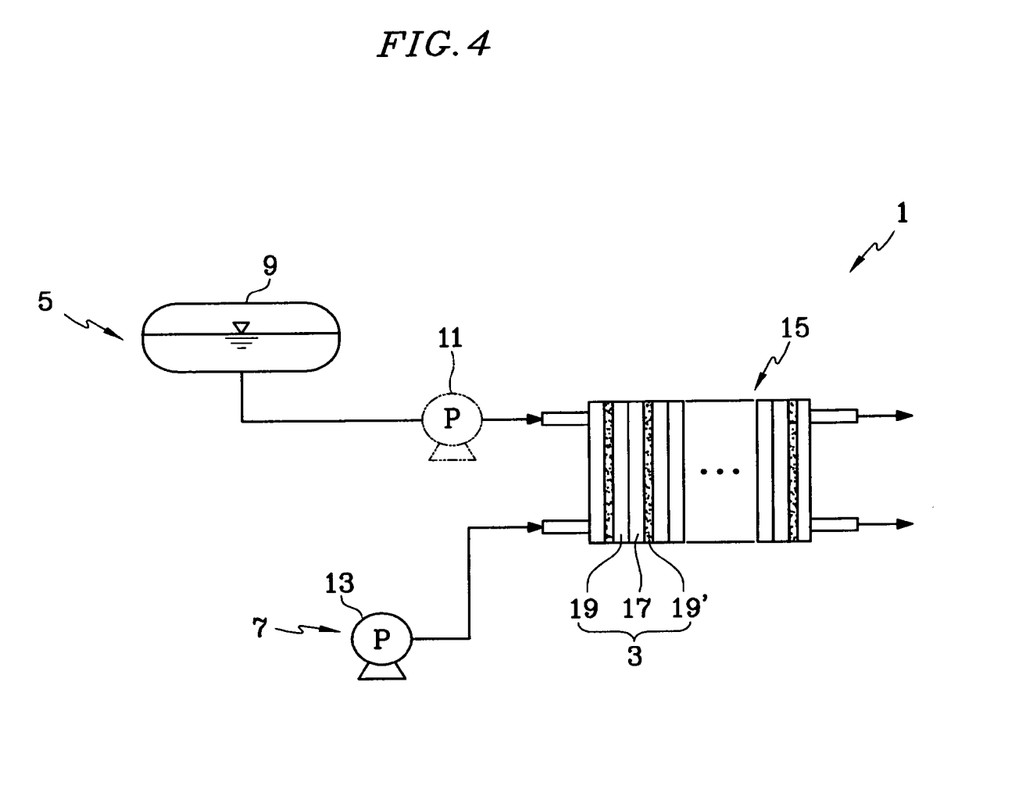
FIG. 4 schematically shows a fuel cell system according to an embodiment of the present invention.

FIG. 4 shows the schematic structure of a fuel cell system 1 which will be described in detail with reference to this accompanying drawing as follows. Specifically, FIG. 4 illustrates a fuel cell system 1 wherein a fuel and an oxidant are provided to the electricity generating element 3 through pumps 11 and 13, but the present invention is not limited to such a structure. Alternatively, the fuel cell system of the present invention may include a structure wherein a fuel and an oxidant are provided in a diffusion manner.

The fuel cell system 1 includes at least one electricity generating element 3 which generates electrical energy through an electrochemical reaction of a fuel and an oxidant, a fuel supplier 5 for supplying a fuel to the electricity generating element 3, and an oxidant supplier 7 for supplying an oxidant to the electricity generating element 3.

In addition, the fuel supplier 5 is equipped with a tank 9 which stores the fuel, and a pump 11 which is connected therewith. The fuel pump 11 supplies fuel stored in the tank 9 with a predetermined pumping power.

The oxidant supplier 7, which supplies the electricity generating element 3 with an oxidant, is equipped with at least one pump 13 for supplying an oxidant with a predetermined pumping power.

The electricity generating element 3 includes a membrane-electrode assembly 17 which oxidizes hydrogen or a fuel and reduces an oxidant, and separators 19 and 19' which are respectively positioned at opposite sides of the membrane-electrode assembly 17, and which supply the hydrogen or a fuel, and the oxidant. At least one electricity generating element 17 is composed in a stack 15.

The following examples illustrate the present invention in more detail. However, it is understood that the present invention is not limited by these examples.

EXAMPLE 1

1 wt % of gold nanoparticles with an average particle size of 100 nm was mixed with 99 wt % of NAFION/$H_2O$/2-propanol (Solution Technology Inc.) in a concentration of 5 wt %.

Then, 12 wt % of the mixture was mixed with 88 wt % of a Pt—Ru black catalyst, preparing a catalyst composition for an anode. The catalyst composition for an anode was coated on carbon paper to prepare an anode.

Next, 1 wt % of gold nanoparticles with an average particle size of 100 nm was mixed with NAFION/$H_2O$/2-propanol (Solution Technology Inc.) in a concentration of 5 wt %.

12 wt % of the mixture was mixed with 88 wt % of a Pt black catalyst, preparing a catalyst composition for a cathode. The catalyst composition for a cathode was coated on carbon paper to prepare a cathode.

The anode and the cathode were used with a commercially-available Nafion 115 (perfluorosulfonic acid) polymer electrolyte membrane to fabricate a membrane-electrode assembly.

EXAMPLE 2

88 wt % of a Pt—Ru black catalyst was mixed with 12 wt % of NAFION/$H_2O$/2-propanol (Solution Technology Inc.) in a concentration of 5 wt % as a binder.

99 wt % of the mixture was mixed with 1 wt % of gold nanoparticles with an average particle size of 100 nm, preparing a catalyst composition for an anode. The catalyst composition for the anode was coated on carbon paper to prepare the anode.

Next, 88 wt % of a Pt black catalyst was mixed with 12 wt % of NAFION/$H_2O$/2-propanol (Solution Technology Inc.) in a concentration of 5 wt % as a binder.

99 wt % of the mixture was mixed with 1 wt % of gold nanoparticles with an average particle size of 100 nm to prepare a catalyst composition for a cathode. The catalyst composition for the cathode was coated on carbon paper to prepare the cathode.

The anode and the cathode were used with a Nafion 115 (perfluorosulfonic acid) polymer electrolyte membrane to fabricate a membrane-electrode assembly.

EXAMPLE 3

1 wt % of gold nanoparticles with an average particle size of 100 nm was mixed with 99 wt % of a Pt—Ru black catalyst. 88 wt % of the mixture was mixed with 12 wt % of a NAFION/$H_2O$/2-propanol (Solution Technology Inc.) in a concentration of 5 wt % to prepare a catalyst composition for an anode. The catalyst composition for the anode was coated on carbon paper to prepare the anode.

Next, 1 wt % of gold nanoparticles with an average particle size of 100 nm was mixed with 99 wt % of a Pt black catalyst. 88 wt % of the mixture was mixed with 12 wt % of NAFION/$H_2O$/2-propanol (Solution Technology Inc.) in a concentration of 5 wt % as a binder to prepare a catalyst composition for a cathode. The catalyst composition for the cathode was coated on carbon paper to prepare the cathode.

The anode and the cathode were used with a commercially-available NAFION 115 (perfluorosulfonic acid) polymer electrolyte membrane to prepare a membrane-electrode assembly.

COMPARATIVE EXAMPLE 1

88 wt % of a Pt—Ru black catalyst was mixed with 12 wt % of NAFION/$H_2O$/2-propanol (Solution Technology Inc.) in a concentration of 5 wt % as a binder. The catalyst composition for an anode was coated on carbon paper to prepare the anode.

Next, a catalyst composition for a cathode was prepared by mixing 88 wt % of a Pt black catalyst and 12 wt % of NAFION/$H_2O$/2-propanol (Solution Technology Inc.) in a concentration of 5 wt % as a binder. The catalyst composition for the cathode was coated on carbon paper to prepare the cathode.

The anode and the cathode were used with a commercially-available NAFION 115 (perfluorosulfonic acid) polymer electrolyte membrane to prepare a membrane-electrode assembly.

The membrane-electrode assemblies according to Examples 1 thru 3 and Comparative Example 1 were used to fabricate unit cells. The unit cells were operated after being supplied with 1M of methanol. Then, the fuel cells were measured regarding power density (unit: mW/cm$^2$) at 0.45V, 0.4V, and 0.35V at 50° C., 60° C., and 70° C., respectively. The results are shown in the following Table 1.

TABLE 1

|  | 50° C. | | | 60° C. | | | 70° C. | | |
| --- | --- | --- | --- | --- | --- | --- | --- | --- | --- |
|  | 0.45 V | 0.4 V | 0.35 V | 0.45 V | 0.4 V | 0.35 V | 0.45 V | 0.4 V | 0.35 V |
| Comparative Example 1 | 44 | 64 | 84 | 50 | 80 | 102 | 77 | 109 | 130 |
| Example 1 | 54 | 73 | 91 | 77 | 105 | 103 | 104 | 136 | 158 |
| Example 2 | 54 | 79 | 91 | 72 | 100 | 116 | 90 | 123 | 141 |
| Example 3 | 63 | 76 | 84 | 63 | 76 | 84 | 104 | 128 | 140 |

As shown in Table 1, the fuel cells which included more metal nanoparticles in a catalyst layer of Examples 1 thru 3 had a power density at low and high temperatures which was higher than that of Comparative Example 1. In addition, the fuel cell of Example 1, which was fabricated by first mixing metal nanoparticles and a binder, had a power density which was more improved than that of Examples 2 and 3.

EXAMPLE 4

A membrane-electrode assembly was fabricated by the same method as in Example 1, except that 0.001 wt % of gold nanoparticles with an average particle size of 100 nm was mixed with NAFION/$H_2O$/2-propanol (Solution Technology Inc.) in a concentration of 99.999 wt %.

EXAMPLE 5

A membrane-electrode assembly was fabricated by the same method as in Example 1, except that 0.05 wt % of gold nanoparticles with an average particle size of 100 nm was mixed with NAFION/$H_2O$/2-propanol (Solution Technology Inc.) in a concentration of 99.5 wt %.

EXAMPLE 6

A membrane-electrode assembly was fabricated by the same method as in Example 1, except that 0.07 wt % of gold nanoparticles with an average particle size of 100 nm was mixed with NAFION/$H_2O$/2-propanol (Solution Technology Inc.) in a concentration of 99.3 wt %.

EXAMPLE 7

A membrane-electrode assembly was fabricated by the same method as in Example 1, except that 0.09 wt % of gold nanoparticles with an average particle size of 100 nm was mixed with NAFION/$H_2O$/2-propanol (Solution Technology Inc.) in a concentration of 99.1 wt %.

EXAMPLE 8

A membrane-electrode assembly was fabricated by the same method as in Example 1, except that 10 wt % of gold nanoparticles with an average particle size of 100 nm was mixed with NAFION/$H_2O$/2-propanol (Solution Technology Inc.) in a concentration of 90 wt %.

EXAMPLE 9

A membrane-electrode assembly was fabricated by the same method as in Example 1, except that 5 wt % of gold nanoparticles with an average particle size of 100 nm was mixed with NAFION/$H_2O$/2-propanol (Solution Technology Inc.) in a concentration of 95 wt %.

EXAMPLE 10

A membrane-electrode assembly was fabricated by the same method as in Example 1, except that 2 wt % of gold nanoparticles with an average particle size of 100 nm was mixed with NAFION/$H_2O$/2-propanol (Solution Technology Inc.) in a concentration of 98 wt %.

EXAMPLE 11

A membrane-electrode assembly was fabricated by the same method as in Example 1, except that 7 wt % of gold nanoparticles with an average particle size of 100 nm was mixed with NAFION/$H_2O$/2-propanol (Solution Technology Inc.) in a concentration of 93 wt %.

A fuel cell was fabricated using the membrane-electrode assembly prepared according to Examples 4 thru 11, and was measured regarding power density by the same method as in Examples 1 thru 3 and Comparative Example 1. Comparing the results, the fuel cells of Examples 4 thru 11 had a power density at low and high temperatures which was much better than that of Comparative Example 1, as did those of Examples 1 thru 3. In addition, the fuel cells including a membrane-electrode assembly of Examples 4 thru 7 had a power density which was higher than those of Examples 8 thru 11.

As described above, the metal nanoparticles in the catalyst layer improve electrical conductivity, and also have catalyst activity to implement a catalytic synergetic effect so as to provide a high power fuel cell.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An electrode for a fuel cell, comprising:
    an electrode substrate; and
    a catalyst layer disposed on the electrode substrate and including metal nanoparticles, a binder and a catalyst, the catalyst being a different material from the metal nanoparticles, the metal nanoparticles being selected from the group consisting of Au, Ag, Rh, Ir, and combinations thereof, the metal nanoparticles and the binder being used in a mixing ratio of 0.001 to 10 wt %:99.999 to 90 wt %, the catalyst layer having a structure of either the catalyst being disposed on the binder, in which the metal nanoparticles are dispersed and the catalyst is not dispersed, or the metal nanoparticles and the catalyst being mixed on a surface of the binder where the metal nanoparticles and the catalyst are not dispersed in the binder.

2. The electrode of claim 1, wherein the metal nanoparticles include Au.

3. The electrode of claim 1, wherein the metal nanoparticles comprise:
    a first metal selected from the group consisting of Au, Ag, Rh, Ir, and combinations thereof; and
    a second metal selected from the group consisting of W, Mo, and combinations thereof.

4. The electrode of claim 1, wherein the metal nanoparticles and the binder are used in a mixing ratio of 0.05 to 1 wt %:99.5 to 99 wt %.

5. The electrode of claim 1, wherein the metal nanoparticles have an average particle size ranging from 1 to 200 nm.

6. The electrode of claim 5, wherein the metal nanoparticles have an average particle size ranging from 10 to 100 nm.

7. The electrode of claim 1, wherein the catalyst comprises one of at least one metal alone and at least one metal supported on a carrier, said at least one metal being selected from the group consisting of platinum, ruthenium, osmium, a platinum-ruthenium alloy, a platinum-osmium alloy, a platinum-palladium alloy, and a platinum-M alloy, where M is one of a transition element selected from the group consisting of Ga, Ti, V, Cr, Mn, Fe, Co, Ni, Cu, Zn, Sn, Mo, W, Rh, Ru and combinations thereof.

8. The electrode of claim 7, wherein the carrier comprises one of a carbon-based material and an inorganic material.

9. The electrode of claim 1, wherein the electrode substrate is selected from the group consisting of carbon paper, carbon cloth, carbon felt, and metal cloth.

10. The electrode of claim 1, wherein the electrode is an anode.

11. A membrane-electrode assembly for a fuel cell, comprising:
an anode and a cathode facing each other; and
a polymer electrolyte membrane interposed between the anode and the cathode;
wherein at least one of the anode and the cathode comprises an electrode substrate and a catalyst layer disposed on the electrode substrate, the catalyst layer including metal nanoparticles, a binder and a catalyst, the catalyst being a different material from the metal nanoparticles, the metal nanoparticles including a metal selected from the group consisting of Au, Ag, Rh, Ir, and combinations thereof, the metal nanoparticles and the binder being used in a mixing ratio of 0.001 to 10 wt %:99.999 to 90 wt %, the catalyst layer having a structure of either the catalyst being disposed on the binder, in which the metal nanoparticles are dispersed and the catalyst is not dispersed, or the metal nanoparticles and the catalyst being mixed on a surface of the binder where the metal nanoparticles and the catalyst are not dispersed in the binder.

12. The membrane-electrode assembly of claim 11, wherein the metal nanoparticles include Au.

13. The membrane-electrode assembly of claim 11, wherein the metal nanoparticles include:
a first metal selected from the group consisting of Au, Ag, Rh, Ir, and combinations thereof; and
a second metal selected from the group consisting of W, Mo, and combinations thereof.

14. The membrane-electrode assembly of claim 11, wherein the metal nanoparticles and the binder are used in a mixing ratio of 0.05 to 1 wt %:99.5 to 99 wt %.

15. The membrane-electrode assembly of claim 11, wherein the metal nanoparticles have an average particle size ranging from 1 to 200 nm.

16. The membrane-electrode assembly of claim 15, wherein the metal nanoparticles have an average particle size ranging from 10 to 100 nm.

17. The membrane-electrode assembly of claim 11, wherein the catalyst comprises one of at least one metal alone and at least one metal supported on a carrier, said at least one metal being selected from the group consisting of platinum, ruthenium, osmium, a platinum-ruthenium alloy, a platinum-osmium alloy, a platinum-palladium alloy, and a platinum-M alloy, where M is a transition element selected from the group consisting of Ga, Ti, V, Cr, Mn, Fe, Co, Ni, Cu, Zn, Sn, Mo, W, Rh, Ru, and combinations thereof.

18. The membrane-electrode assembly of claim 17, wherein the carrier comprises one of a carbon-based material and an inorganic material.

19. The membrane-electrode assembly of claim 11, wherein the electrode substrate is selected from the group consisting of carbon paper, carbon cloth, carbon felt, and metal cloth.

20. The membrane-electrode assembly of claim 11, wherein the membrane-electrode assembly is used as a direct oxidation fuel cell.

21. A fuel cell system, comprising:
an electricity generating element which includes a membrane-electrode assembly comprising an anode and a cathode facing each other, and a polymer electrolyte membrane interposed between the anode and the cathode, wherein at least one of the anode and the cathode comprises an electrode substrate and a catalyst layer disposed on the electrode substrate, the catalyst layer including metal nanoparticles, a binder and a catalyst, the catalyst being a different material from the metal nanoparticles, the metal nanoparticles including a metal selected from the group consisting of Au, Ag, Rh, Ir, and combinations thereof, the metal nanoparticles and the binder being used in a mixing ratio of 0.001 to 10 wt %:99.999 to 90 wt %, the catalyst layer having a structure of either the catalyst being disposed on the binder, in which the metal nanoparticles are dispersed and the catalyst is not dispersed, or the metal nanoparticles and the catalyst being mixed on a surface of the binder where the metal nanoparticles and the catalyst are not dispersed in the binder;
a fuel supplier for providing fuel to the electricity generating element; and
an oxidant supplier for providing an oxidant to the electricity generating element.

22. The fuel cell system of claim 21, wherein the metal nanoparticles include Au.

23. The fuel cell system of claim 21, wherein the metal nanoparticles comprise:
a first metal selected from the group consisting of Au, Ag, Rh, Ir, and combinations thereof; and
a second metal selected from the group consisting of W, Mo, and combinations thereof.

24. The fuel cell system of claim 21, wherein the metal nanoparticles and the binder are used in a mixing ratio of 0.05 to 1 wt %:99.5 to 99 wt %.

25. The fuel cell system of claim 21, wherein the metal nanoparticles have an average particle size ranging from 1 to 200 nm.

26. The fuel cell system of claim 25, wherein the metal nanoparticles have an average particle size ranging from 10 to 100 nm.

27. The fuel cell system of claim 21, wherein the catalyst comprises one of at least one metal alone and at least one metal supported on a carrier, said at least one metal being selected from the group consisting of platinum, ruthenium, osmium, a platinum-ruthenium alloy, a platinum-osmium alloy, a platinum-palladium alloy, and a platinum-M alloy, where M is a transition element selected from the group consisting of Ga, Ti, V, Cr, Mn, Fe, Co, Ni, Cu, Zn, Sn, Mo, W, Rh, Ru, and combinations thereof.

28. The fuel cell system of claim 27, wherein the carrier comprises one of a carbon-based material and an inorganic material.

29. The fuel cell system of claim 21, wherein the electrode substrate is selected from the group consisting of carbon paper, carbon cloth, carbon felt, and metal cloth.

30. The fuel cell system of claim 21, wherein the fuel is a hydrocarbon fuel.

* * * * *